(12) United States Patent
Lanzerath et al.

(10) Patent No.: US 10,005,118 B2
(45) Date of Patent: Jun. 26, 2018

(54) METHOD FOR JOINING COMPONENTS MADE OF HIGH-STRENGTH STEEL

(75) Inventors: Horst Heribert Lanzerath, Bad Muenstereifel (DE); Jochen Schenk, Bonn (DE)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 13/823,920

(22) PCT Filed: Oct. 6, 2011

(86) PCT No.: PCT/EP2011/067453
§ 371 (c)(1),
(2), (4) Date: May 22, 2013

(87) PCT Pub. No.: WO2012/049065
PCT Pub. Date: Apr. 19, 2012

(65) Prior Publication Data
US 2013/0248092 A1    Sep. 26, 2013

(30) Foreign Application Priority Data
Oct. 15, 2010    (DE) .................. 10 2010 042 538

(51) Int. Cl.
*B21D 53/88* (2006.01)
*B21D 39/04* (2006.01)
*F16B 17/00* (2006.01)

(52) U.S. Cl.
CPC ............. *B21D 53/88* (2013.01); *B21D 39/04* (2013.01); *B21D 39/048* (2013.01);
(Continued)

(58) Field of Classification Search
CPC .... B21D 53/88; B21D 39/048; B21D 39/046; B21D 39/04; B62D 21/05; B62D 21/02;
(Continued)

(56) References Cited

U.S. PATENT DOCUMENTS 630,054 A  *  8/1899  Heyman ................ B62D 21/02
                                                            280/796
2,504,625 A  *  4/1950  Barnhart et al. ........... 285/289.3
(Continued)

FOREIGN PATENT DOCUMENTS

DE    19721478 A1  * 11/1998  ............. B21D 39/04
DE    10347101 A1  *  5/2005  ............. B21D 39/04
(Continued)

OTHER PUBLICATIONS

Machine English translation of DE 102007022297.*

*Primary Examiner* — Jason L Vaughan
(74) *Attorney, Agent, or Firm* — LeClairRyan

(57) ABSTRACT

A method for the joining of hollow profiles made from high-strength steel, in particular to form a motor vehicle frame, the hollow profiles being connected to one another, nonpositively and positively against being pulled out, by pinching (crimping) in a connection zone, one end of at least one of the hollow profiles having a connection zone for pinching which is soft at least during forming. This soft connection zone may be hardened during pinching if at least one of the profiles to be joined is made from hardenable steel and is brought to austenizing temperature before pinching.

14 Claims, 2 Drawing Sheets

(52) U.S. Cl.
CPC ....... *F16B 17/004* (2013.01); *Y10T 29/49929* (2015.01); *Y10T 156/1028* (2015.01)

(58) Field of Classification Search
CPC ....... B62D 21/03; B62D 21/04; B23P 11/005; F16L 13/161; F16L 13/007; F16L 13/141; F16L 13/16; Y10T 29/49954; Y10T 29/4987; Y10T 29/49872; Y10T 29/49909; Y10T 29/49913; Y10T 29/49915; Y10T 29/49917; Y10T 29/49918; Y10T 29/49925; Y10T 29/49929; Y10T 29/49931; Y10T 29/49622; Y10T 29/49623; Y10T 29/49933; Y10T 156/1028; F16B 17/004
USPC ... 29/469.5, 897.2, 505, 508, 510, 516, 515, 29/521; 285/148.11, 382.1, 382.2, 417; 148/527, 529, 537, 112, 219, 220, 226, 148/519, 520, 590, 593, 598, 599
See application file for complete search history.

(56) References Cited

U.S. PATENT DOCUMENTS

| | | | | |
|---|---|---|---|---|
| 3,068,563 | A * | 12/1962 | Reverman | 29/458 |
| 3,124,874 | A * | 3/1964 | Woolley | A44B 19/403 285/382.2 |
| 3,378,282 | A * | 4/1968 | Demler, Sr. | 285/148.13 |
| 3,572,779 | A * | 3/1971 | Dawson | 285/382.2 |
| 3,889,354 | A * | 6/1975 | Nishi et al. | 29/516 |
| 4,257,155 | A * | 3/1981 | Hunter | B21D 39/04 285/382.2 |
| 4,330,924 | A * | 5/1982 | Kushner | B21D 39/04 285/382.2 |
| 4,371,199 | A * | 2/1983 | Kushner et al. | 285/382.2 |
| 4,541,655 | A * | 9/1985 | Hunter | B21D 39/04 285/382.2 |
| 4,541,659 | A * | 9/1985 | Nakamura | 285/382.2 |
| 4,624,489 | A * | 11/1986 | Nakamura | 285/382 |
| 4,627,146 | A * | 12/1986 | Ward | B21D 39/04 285/382.1 |
| 4,645,247 | A * | 2/1987 | Ward | B21D 39/04 285/374 |
| 4,719,074 | A * | 1/1988 | Tsuno | B23P 11/00 123/193.1 |
| 4,735,355 | A * | 4/1988 | Browning | B62D 21/08 228/138 |
| 5,647,054 | A * | 7/1997 | Jones | 392/397 |
| 5,737,975 | A * | 4/1998 | Hanisch | B23P 11/00 74/567 |
| 5,794,398 | A * | 8/1998 | Kaehler | B21C 37/29 29/421.1 |
| 5,848,469 | A * | 12/1998 | O'Connor | B21D 39/044 29/523 |
| 6,099,084 | A * | 8/2000 | Bungarten et al. | 301/127 |
| 6,186,102 | B1 * | 2/2001 | Kosuge | F01L 1/053 123/90.16 |
| 6,286,213 | B1 * | 9/2001 | Hada | F02M 35/10144 29/507 |
| 6,408,515 | B1 * | 6/2002 | Durand | B62D 21/11 180/312 |
| 6,460,250 | B1 * | 10/2002 | Amborn et al. | 29/897.2 |
| 6,477,774 | B1 * | 11/2002 | Marando | B23K 20/06 219/59.1 |
| 6,641,178 | B2 * | 11/2003 | Gowing | 285/347 |
| 6,702,029 | B2 * | 3/2004 | Metcalfe | B21D 17/04 166/208 |
| 6,802,916 | B2 * | 10/2004 | Rateick, Jr. | B21K 1/76 148/674 |
| 6,813,818 | B2 * | 11/2004 | Schmidt | B21D 26/14 219/611 |
| 7,124,490 | B2 * | 10/2006 | Kellermeier | B21D 53/88 29/432.2 |
| 7,578,060 | B2 * | 8/2009 | Durand | B62D 21/02 29/897.2 |
| 7,971,887 | B2 * | 7/2011 | Dorr et al. | 280/124.109 |
| 2002/0162224 | A1 * | 11/2002 | Gabbianelli | B21D 26/033 29/897.2 |
| 2006/0273274 | A1 * | 12/2006 | Nagaoka | F02M 51/0675 251/129.18 |
| 2008/0120844 | A1 * | 5/2008 | Yang | B21D 26/14 29/897.2 |
| 2008/0277040 | A1 * | 11/2008 | Okamoto et al. | 152/539 |
| 2009/0045621 | A1 * | 2/2009 | Heraud | F16L 13/103 285/286.2 |
| 2011/0030526 | A1 * | 2/2011 | Miyazaki et al. | 83/651 |

FOREIGN PATENT DOCUMENTS

| | | | | |
|---|---|---|---|---|
| DE | 102007022297 | A1 * | 11/2008 | ................ F16B 5/08 |
| EP | 0995666 | A1 | 4/2000 | |
| EP | 1609980 | A1 * | 12/2005 | ........ F02M 51/0675 |
| FR | 2632218 | A1 * | 12/1989 | ............ B21D 26/14 |
| GB | 2090930 | A * | 7/1982 | ............ B21D 39/04 |
| JP | 08086388 | A * | 4/1996 | |
| JP | 2001130209 | A * | 5/2001 | |

* cited by examiner

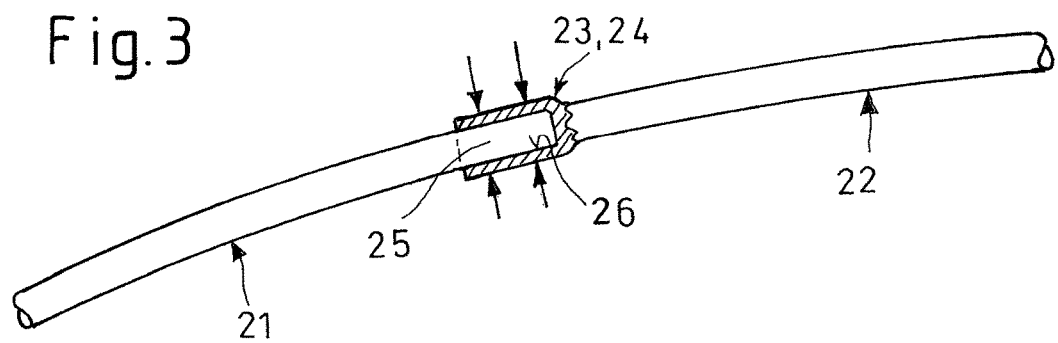
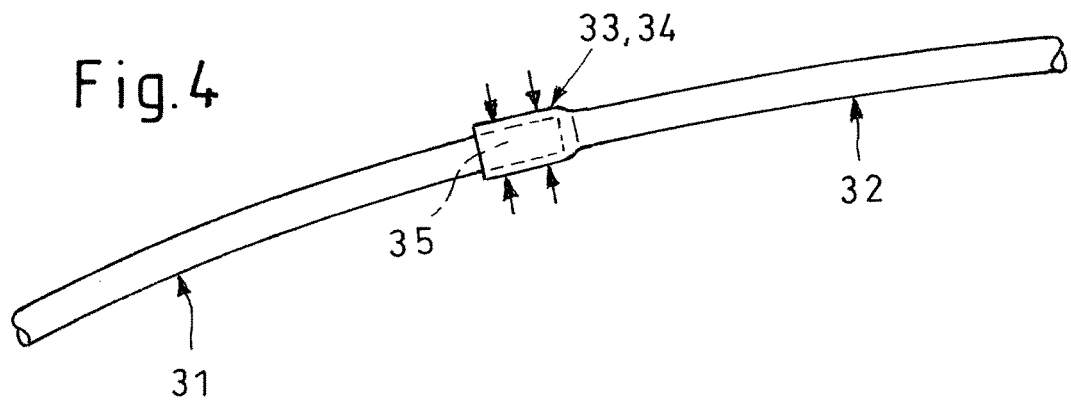

METHOD FOR JOINING COMPONENTS MADE OF HIGH-STRENGTH STEEL

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION

(1) Field of the Invention

The invention relates to a method for the joining of hollow profiles made from high-strength steel, in particular to form a motor vehicle frame, the hollow profiles being connected to one another, positively against being pulled out, by pinching or pressing together (crimping) in a connection zone.

(2) Description of Related Art

When high-strength steel is referred to hereafter, this is to be understood to include steel, such as is also known as AHSS (Advanced High Strength Steel) or UHSS (Ultra High Strength Steel). Such steels are also designated as dual-phase (DP, two-phase steel), transformation induced plasticity (TRIP, retained austenitic steel), high hole extension (HHE), complex phase (CP, complex phase steel), high strength low alloy (HSLA), multiphase steel, martensite phase steel and boron steel (steel alloys containing a few ppm of boron, such as, for example, Low carbon manganese boron BS3111 Type 9 and Medium carbon manganese boron BS3111 Type 10 grades from CORUS), etc. It will be appreciated that all the major steel manufacturers have their own designations and qualities, although these essentially conform to one another.

These various steels usually have a tensile strength which, in contrast to "normal" steel, is higher than 300 MPa in the case of AHSS steels and even higher than 700 MPa in the case of UHSS steels and even amounting to more than 1400 MPa in the case of boron and martensite phase steel.

The strength of steels is usually achieved by means of heat treatment, during which operation the steel is quenched and is prevented from being transformed into a lower-strength phase. It is therefore not advisable to heat these steels later during processing for a lengthy period of time and to a greater extent, since they then can suffer considerable losses of strength.

For many different reasons, however, it is desirable, particularly in automobile construction, to use lightweight and high-strength steels. These make it possible, in spite of a reduction in weight due to a saving of material, to have a high-strength body (or other components) which, inter alia, fulfill the growing crash test requirements. Moreover, this saves fuel and reduces emissions of $CO_2$ and of other greenhouse gases.

For this purpose, it is known to weld together steel sheets made from high-strength steels to form body parts.

However, it is not simple to form high-strength steels and subsequently weld them.

It is therefore known to produce a body as a frame structure from hollow profiles, the hollow profiles being plugged one into the other and subsequently being welded together.

However, welding per se presents some problems.

EP 0 995 666 A1, for example, discloses a method for the connection of two or more components of a vehicle body or chassis designed as a tubular frame, which are connected to one another via a plug connection and are additionally fixed, a connection element arranged at the connection point in the overlap and contact region of the components initially being inactive when the components are brought together and, after the plug connection is made, being activated externally and fixing the plug connection.

DE 197 21 478 A1 discloses a method for the connection of hollow profiles, in particular to form a vehicle frame, the hollow profile ends of outer hollow profiles being pushed positively onto inner hollow profile ends and these in each case being connected to one another positively against being pulled out, in each case at least one pocket being introduced into the inner hollow profile ends and being centered thereto, and a boss or bead being pressed with a fit in each case into the outer hollow profile ends and the buckle or bead being introduced latchingly into the associated pocket or, with the pocket used as a die, being formed therein. In addition, adhesive bonding of the nodes is carried out.

A kind of crimp bonding (flanging, pinching, clamping, etc.) is therefore used in order to connect the parts, which will be preferable on account of simplicity and cost.

The problem, however, is that hardened high-strength steels cannot be joined easily by this method. Material cracks and fractures occur. The material also tends in this case to undergo weakening stresses.

BRIEF SUMMARY OF THE INVENTION

The object of the invention is, by contrast, to provide a method for the joining of components which is suitable even for high-strength steels and which nevertheless does not weaken the resulting components. Moreover, the method is to be capable of being employed simply and efficiently.

This object is achieved by means of the method reproduced in claim 1.

Since one end of at least one of the hollow profiles has a soft connection zone, at least during pinching, for the pinching operation, it is possible to employ hot crimping even for high-strength steels, such as UHSS and AHSS steels.

Hence, in the case of the hollow profiles or adaptors (also called nodes), a zone which is not hardened and is therefore soft is provided for connection by pinching. No or only very few controllable material cracks or fractures and also no stresses therefore occur in this connection zone.

Thus, the hollow profiles can be joined together to form hollow frame structures for motor vehicle bodies (known as "space frames") without welding having to be carried out or the otherwise customary metal sheets being used.

The soft non-hardened material in the connection zone may be (locally) rehardened during pinching (hot form pinching) or subsequently, as a result of which the same strength as in the rest of the material of the hollow profile or adaptors can be achieved in the connection region.

Alternatively, it is even possible for only the nodes to be heated, plugged with the two ends of the hollow profiles and then pinched together with the hollow profiles in the hot state in a hot forming process in which joining and hardening take place in one step. In this case, during the hot forming process, the node is deformed and simultaneously quenched, with the result that the node acquires mechanical properties comparable to those of the hollow profiles. Moreover, as a result of quenching, shrinking of the node onto the hollow profiles can take place, so that, in addition to pinching, an additional nonpositive connection can also be obtained due to the shrinkage stresses. Furthermore, the form of nodes and hollow profile ends can be configured, for example by peripheral grooves in the hollow profile and correspondingly formed node, such that a positive connection can also be achieved.

Alternatively, hardening may even be dispensed with if sufficiently high rigidity, etc. is achieved by the doubling of material in the connection zone.

In addition, an adhesive may be introduced in the region of the at least one soft connection zone in order to improve the connection of the components. In this case, the adhesive may be applied in the form of adhesive tapes to the hollow profile ends.

Different variants may be envisaged within the scope of the invention:

A) A first hollow profile end is pushed positively onto a second hollow profile end, the first hollow profile end having the soft connection zone.
B) A first hollow profile end is pushed positively onto a second hollow profile end, the two hollow profile ends having in each case a soft connection zone.
C) A first hollow profile end and a second hollow profile end are positively pushed onto a connection adapter or pushed into a connection adapter, and pinching is carried out in the region of the connection adapter, the adapter being composed of soft "normal" steel and the hollow profile ends having in each case a soft connection zone.
D) A first hollow profile end and a second hollow profile end are positively pushed onto a connection adapter or pushed into a connection adapter, and pinching is carried out in the region of the connection adapter, the adapter likewise being composed of high-strength steel and the hollow profile ends and the adapter having in each case soft connection zones.
E) A first hollow profile end and a second hollow profile end are positively pushed onto a connection adapter or pushed into a connection adapter, and pinching is carried out in the region of the connection adapter, the adapter likewise being composed of hardenable high-strength steel, and the hollow profile ends and the adapter having in each case soft connection zones. The connection zone is subsequently hardened.
F) A first hollow profile end and a second hollow profile end are positively pushed onto a connection adapter heated to austenitizing temperature and made from hardenable steel or pushed into such a connection adapter, and pinching and simultaneous hardening are carried out in the region of the connection adapter.

BRIEF DESCRIPTION OF THE SEVERAL VIEWS OF THE DRAWINGS

Further features, details and advantages of the invention may be gathered from the following description of exemplary embodiments, with reference to the drawing, in which:

FIG. 3 shows a diagrammatic view of a further embodiment of the invention; and

FIG. 4 shows a diagrammatic view of still another embodiment of the invention.

DETAILED DESCRIPTION OF THE PREFERRED EMBODIMENTS

Figure 1A:
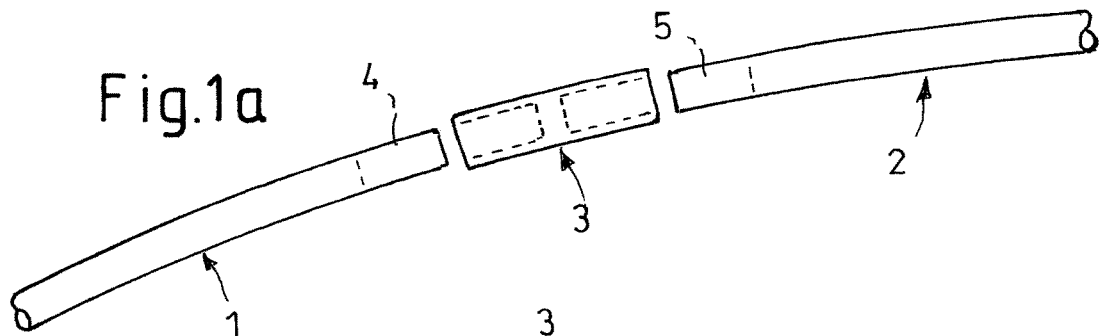
FIG. 1 shows a diagrammatic view of one embodiment of the invention.

In the attached figures the same reference numerals will be used to refer to the same components. In the following description various operating parameters and components are described for different constructed embodiments. These specific parameters and components are included as examples and are not meant to be limiting.

Figure 1B:
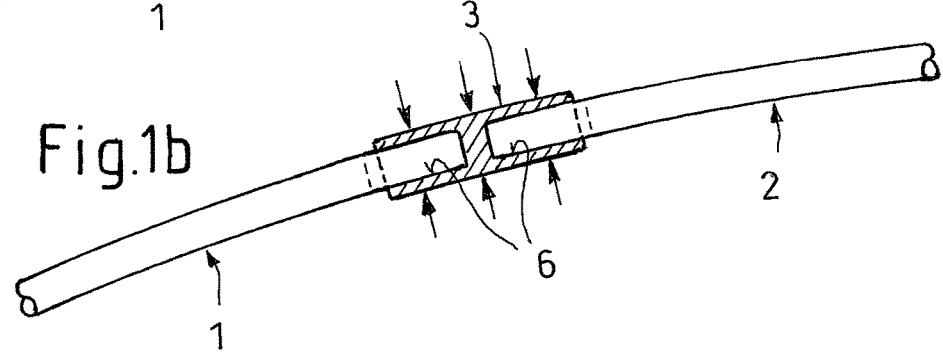

FIG. 1 shows a diagrammatic view of a first embodiment of the invention before assembly (FIG. 1a) and during joining (FIG. 1b).

FIGS. 1a and 1b show two hollow profiles 1 and 2 made from boron steel and an adapter 3 made from unhardened boron steel, into which the ends 4, 5 of the hollow profiles 1 and 2 are pushed. The ends 4, 5 of the hollow profiles 1 and 2 in each case possess, for pinching, a soft connection zone in which the boron steel is unhardened. The ends 4, 5 are pushed with this zone into the adapter 3.

Pinching is subsequently carried out (indicated by the arrows in FIG. 1b), in which pressure is exerted upon the adapter from outside in a known way, with the result that the adapter 3 and the soft zones 4, 5 are deformed and the hollow profiles 1, 2 are connected to one another, positively against being pulled out, in the region of the connection zone by means of the adapter 3. Sufficiently high rigidity and a firm connection are achieved in the connection region as a result of the doubling of material. It will be appreciated that the adapter may also be configured in order to connect more than two parts.

In the embodiment according to FIG. 2, in contrast, an adapter 13 which is composed of unhardened boron steel is employed.

Figure 2A:
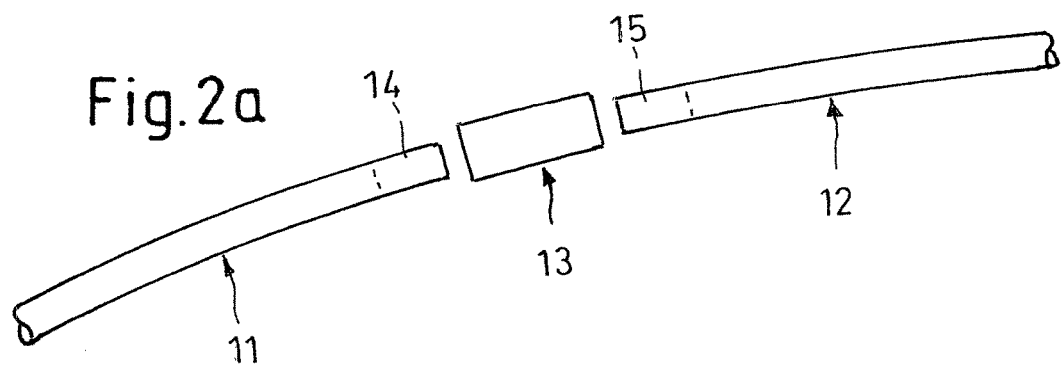
FIG. 2 shows a diagrammatic view of a second embodiment of the invention.
Figure 2B:
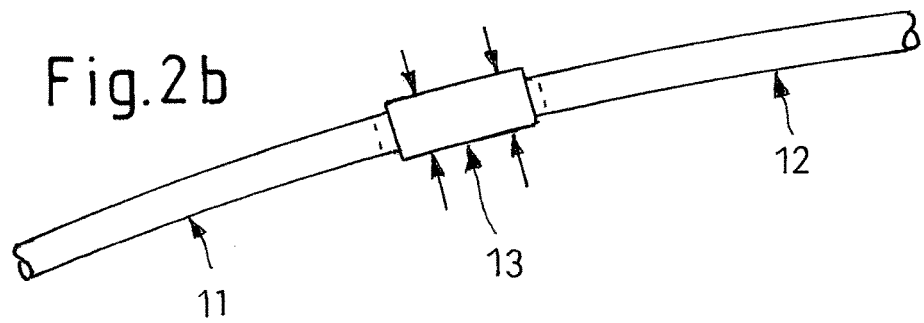

FIGS. 2a and 2b show two hollow profiles 11 and 21 and an adapter 13, all made from unhardened boron steel. The ends 14, 15 of the hollow profiles 11 and 12 are pushed into the adapter 13.

Pinching is subsequently carried out (indicated by the arrows in FIG. 2b), in which pressure is exerted upon the adapter from outside in a known way, with the result that the adapter 13 and the soft zones 14, 15 are deformed and the hollow profiles 11, 12 are connected to one another, positively against being pulled out, in the region of the connection zone by means of the adapter 13. The composite structure comprising the parts 11, 12 and 13 is subsequently hardened. Homogeneous material properties are thereby achieved.

Alternatively, the two hollow profiles 11 and 21 shown in FIGS. 2a and 2b may be made from already hardened boron steel and an adapter 13 may be made from unhardened boron steel. The ends 14, 15 of the hollow profiles 11 and 12 are pushed into the adapter 13.

Pinching is subsequently carried out (indicated by the arrows in FIG. 2b), in which pressure is exerted upon the adapter from outside in a known way, with the result that the adapter 13 and the soft zones 14, 15 are deformed and the hollow profiles 11, 12 are connected to one another, positively against being pulled out, in the region of the connection zone by means of the adapter 13. The composite structure comprising the parts 11, 12 and 13 is subsequently hardened. Homogeneous material properties are thereby achieved.

As a further variant, the two hollow profiles 11 and 21 shown in FIGS. 2a and 2b may likewise be made from already hardened boron steel and an adapter 13 may be made from unhardened boron steel. The ends 14, 15 of the hollow profiles 11 and 12 are pushed into the adapter 13 and are heated to austenitization temperature.

Pinching is subsequently carried out (indicated by the arrows in FIG. 2b), in which pressure is exerted upon the adapter from outside in a known way, with the result that the adapter 13 and the soft zones 14, 15 are deformed and the hollow profiles 11, 12 are connected to one another, positively against being pulled out, in the region of the connection zone by means of the adapter 13. At the same time, the adapter is cooled and consequently hardened. Shrinkage of the adapter onto the hollow profiles is thereby achieved at the same time and leads to an increased nonpositive connection. Moreover, homogeneous material properties are achieved in the adapter and hollow profiles.

FIG. 3 shows a diagrammatic view of a further embodiment of the invention during joining.

A hollow profile 22 made from hardened boron steel has at one end 24 an inside diameter widening 23, into which a second hollow profile 21 made from hardened boron steel is pushed with its end 25 and which functions virtually as an adapter. The end 24 of the hollow profile 22 is a soft connection zone, in which the boron steel is unhardened, for pinching. Moreover, this zone 24 is provided with adhesive 26.

Pinching is subsequently carried out (indicated by the arrows in FIG. 3), in which pressure is exerted upon the adapter from outside in a known way, with the result that the inside diameter widening 23 is deformed and the hollow profiles 21, 22 are connected to one another, positively against being pulled out, in the region of the connection zone. Sufficiently high rigidity and a firm connection are achieved by the doubling of material and adhesive bonding in the connection region.

FIG. 4 shows a diagrammatic view of a further embodiment of the invention during joining.

A hollow profile 32 made from unhardened boron steel has at one end 34 an inside diameter widening 33, into which a second hollow profile 31 made from unhardened boron steel is pushed with its end 35 and which functions virtually as an adapter. The end 34 of the hollow profile 32 and the end 35 of the hollow profile 32 are soft connection zones for pinching.

Pinching is subsequently carried out (indicated by the arrows in FIG. 4), in which pressure is exerted upon the adapter from outside in a known way, with the result that the inside diameter widening 33 is deformed and the hollow profiles 31, 32 are connected to one another, positively against being pulled out, in the region of the connection zone.

The composite structure comprising the parts 31 and 32 is subsequently hardened. Homogeneous material properties are thus achieved.

The invention claimed is:

1. A method for the joining of hollow profiles formed from high-strength steel and for using the joined hollow profiles to form a motor vehicle frame, the method comprising the steps of:
    providing a first hollow profile formed from hardened high-strength steel having a hardened body and a connection end, said connection end defining an unhardened, soft connection zone having a widened diameter;
    providing a second hollow profile formed from hardened high-strength steel having a hardened body and a connection end, said connection end defining a connection zone;
    inserting said connection zone of said second hollow profile into said connection zone of said first hollow profile such that said connection zones overlap;
    connecting said hollow profiles to one another by pinching said connection zones and simultaneously hardening said connection zones; and
    incorporating the joined profiles directly into the motor vehicle frame without subsequent hardening.

2. The method as claimed in claim 1, wherein said connection zone of said second hollow profile is hardened high-strength steel.

3. The method as claimed in claim 1, wherein said connection zone of said second hollow profile is unhardened and soft high-strength steel.

4. The method as claimed in claim 3, wherein said hollow profiles are formed from boron steel; and wherein said connection zones of said hollow profiles are brought to austenitizing temperature before joining in order to prepare said connection zones of said hollow profiles for simultaneous hardening.

5. A method for the joining of hollow profiles formed from high-strength steel and for using the joined hollow profiles to form a motor vehicle frame, the method comprising the steps of:
    providing a first hollow profile formed from high-strength steel having a hardened body and a connection end, said connection end defining a connection zone;
    providing a second hollow profile formed from high-strength steel having a hardened body and a connection end, said connection end defining a connection zone;
    providing a connection adapter formed from unhardened and soft steel;
    inserting said connection zones of said hollow profiles into opposite ends of said connection adapter;
    connecting said hollow profiles to one another by pinching said connection adapter around said connection zones of said hollow profiles and simultaneously hardening said connection adapter; and
    incorporating the joined profiles directly into the motor vehicle frame without subsequent hardening.

6. The method as claimed in claim 5, wherein said connection adapter has a tensile strength of less than 300 MPa.

7. The method as claimed in claim 5, wherein said connection adapter is formed from boron steel and brought to austenitizing temperature before joining said hollow profiles in order to prepare said connection adapter for simultaneous hardening.

8. The method as claimed in claim 5, wherein said connection ends of said hollow profiles are hardened high-strength steel.

9. The method as claimed in claim 8, wherein said hollow profiles are formed from boron steel.

10. The method as claimed in claim 5, wherein said connection ends of said hollow profiles are unhardened and soft high-strength steel.

11. The method as claimed in claim 5, wherein said connection adapter includes an adhesive disposed in a region of one of said connection zones.

12. The method as claimed in claim 11, wherein said adhesive is in the form of an adhesive tape.

13. The method as claimed in claim 5, wherein an adhesive is disposed on said connection zone of each of said hollow profiles.

14. The method as claimed in claim 13, wherein said adhesive is in the form of an adhesive tape.

* * * * *